Figure 1:
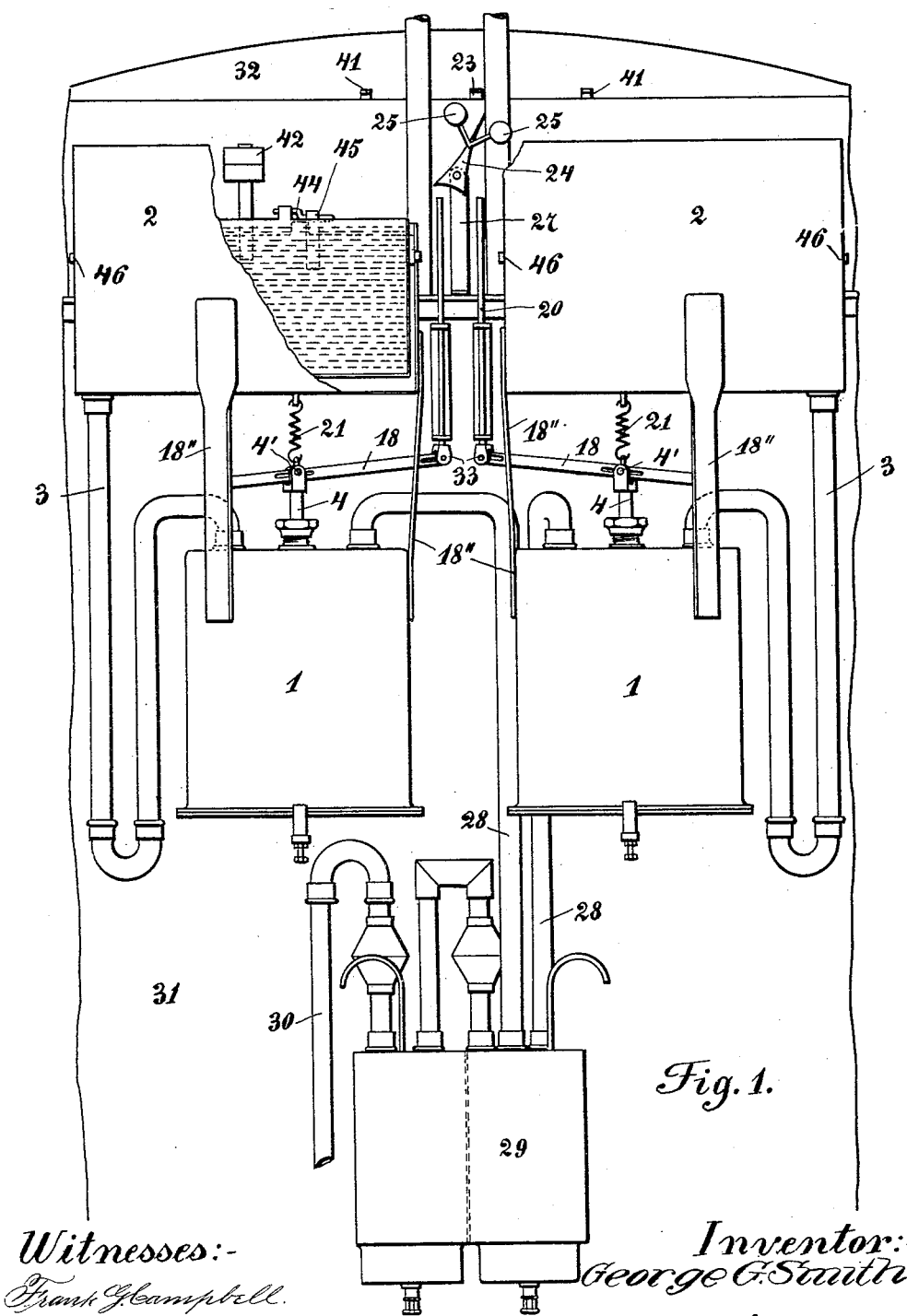

No. 713,353. Patented Nov. 11, 1902.
G. G. SMITH.
ACETYLENE GAS GENERATOR.
(Application filed May 28, 1901.)
(No Model.) 5 Sheets—Sheet 1.

Witnesses:-
Frank G. Campbell.
C. A. Jarvis.

Inventor:-
George G. Smith.
By his Attorney, F. H. Richards.

No. 713,353. Patented Nov. 11, 1902.
G. G. SMITH.
ACETYLENE GAS GENERATOR.
(Application filed May 28, 1901.)
(No Model.) 5 Sheets—Sheet 2.

Witnesses:-
Frank G. Campbell
C. A. Jarvis

Inventor:-
George G. Smith.
By his Attorney, F. H. Richards.

No. 713,353. Patented Nov. 11, 1902.
G. G. SMITH.
ACETYLENE GAS GENERATOR.
(Application filed May 28, 1901.)

(No Model.) 5 Sheets—Sheet 3.

No. 713,353. Patented Nov. 11, 1902.
G. G. SMITH.
ACETYLENE GAS GENERATOR.
(Application filed May 28, 1901.)

(No Model.) 5 Sheets—Sheet 4.

Witnesses:- Inventor:-
Frank F. Campbell George G. Smith,
C. A. Jarvis. By his Attorney F. H. Richards.

No. 713,353. Patented Nov. 11, 1902.
G. G. SMITH.
ACETYLENE GAS GENERATOR.
(Application filed May 28, 1901.)
(No Model.) 5 Sheets—Sheet 5.

Witnesses:-
Frank G Campbell
E. A. Jarvis.

Inventor:-
George G. Smith
By his Attorney
F. H. Richards.

UNITED STATES PATENT OFFICE.

GEORGE GREGORY SMITH, OF FLORENCE, ITALY.

ACETYLENE-GAS GENERATOR.

SPECIFICATION forming part of Letters Patent No. 713,353, dated November 11, 1902.

Application filed May 28, 1901. Serial No. 62,188. (No model.)

*To all whom it may concern:*

Be it known that I, GEORGE GREGORY SMITH, a citizen of the United States of America, residing at San Domenico, Florence, Italy, have invented certain new and useful Improvements in Acetylene-Gas Generators, of which the following is a full, clear, and exact description.

The present invention relates to that class of gas-generators covered in the United States Letters Patent No. 660,169, issued to me October 23, 1900, for acetylene-gas generators; and it consists of certain improvements in the same by means of which the employment of valves in the generating-machine is avoided and the mechanism for puncturing the sealed gas-generating medium is simplified; and a further object of my invention is the provision of means free of valves whereby charges of a gas-producing agent may be automatically supplied to a generator upon reduction of the pressure of gas and also, if desired, charges of liquid sufficient for each charge of the gas-producing agent may be supplied in a similar manner, each charge being held in a suitable charger and the two elements being brought into contact in the chamber automatically and without the use of valves.

In the patent above referred to the gas-generating medium is inserted in the generator in a sealed condition, and when it is required to generate a further quantity of gas the can, tin, or the like containing the medium was punctured at both ends to allow the gas-generating fluid free access to the same and simultaneously to allow the gas produced by the combination of the fluid and the gas-producing medium to escape through the second puncture instead of providing one puncture only for the inlet of the active fluid and the outlet of the gas produced, as had been the case hitherto. In this patent the further necessary supply of gas was effected by the fall of the gasometer consequent upon the consumption of the gas in the same in that in falling the gasometer was caused to release a weight which in falling effected the puncture in the sealed case containing the gas-producing agent and at the same time opened a valve, allowing the gas-generating fluid access to the case.

The employment of a valve in many gas-producing apparatuses, and particularly in the case of those for making acetylene gas, is disadvantageous, it easily gets clogged up, and its action is at no time absolutely reliable.

In the present invention the valve is obviated by providing a movable receptacle for the liquid, which is fed to the generator through a trap when the supply of gas has diminished and said receptacle has been overturned. The latter is self-sealing in the known manner, so that a valve is unnecessary. I have further found that in apparatuses of not too small dimensions the weight of the sinking gasometer is sufficient to produce the puncture without employing a weight for the purpose which is released by the fall of the gasometer. Thus the sinking gasometer will produce the puncture at both ends of the case without appreciably decreasing the pressure of gas in the gasometer during the puncture.

The present invention also comprises certain details of construction, as hereinafter set forth, including hollow puncturing-points, which allow the water to enter the case and the gas to pass out of the same before the said punches have been withdrawn, and a switch mechanism for shifting the bell to operate a series of generators one after the other.

In order to render the present specification easily intelligible, reference is had to the accompanying drawings, in which similar numerals of reference denote similar parts throughout the several views.

Figure 2:
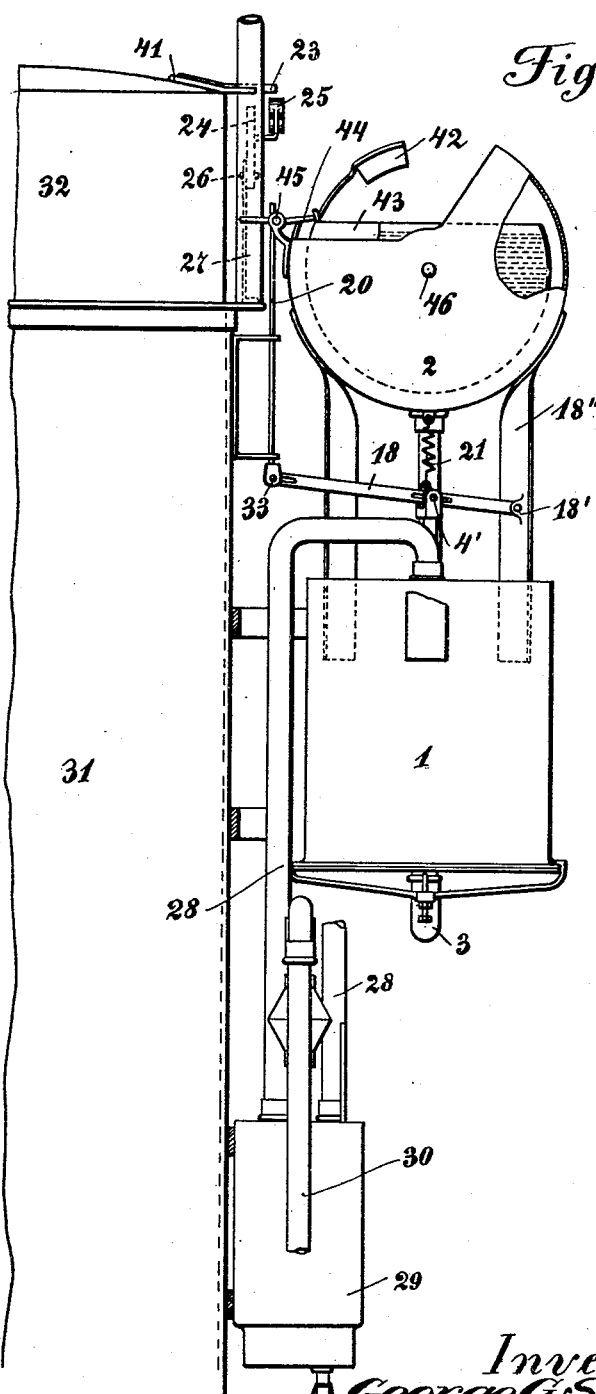
Figure 3:
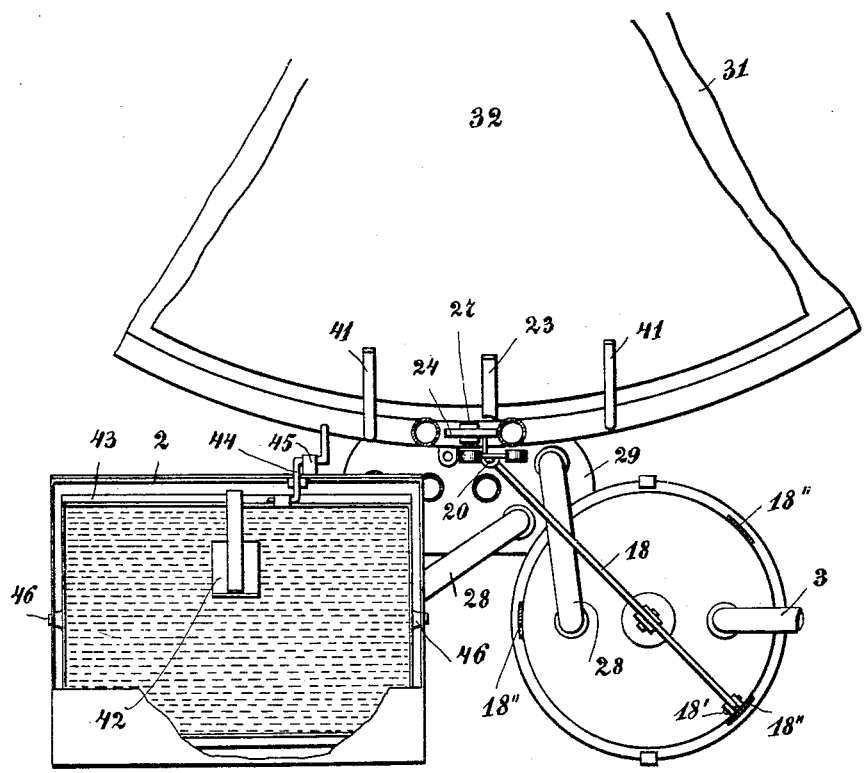
Figure 4:
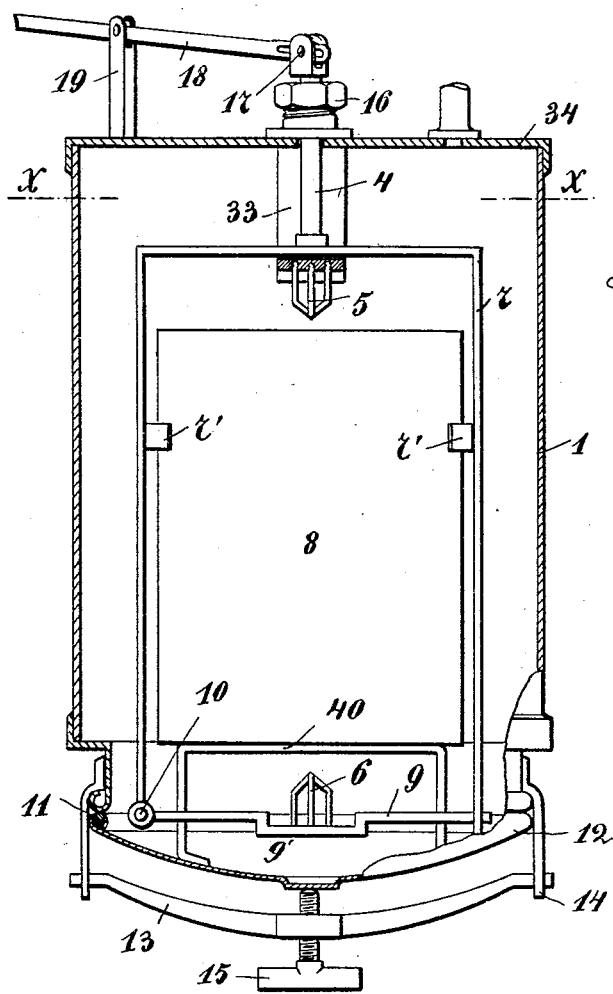
Figure 5:
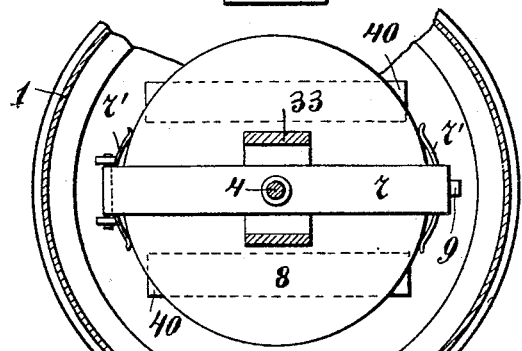
Figure 6:
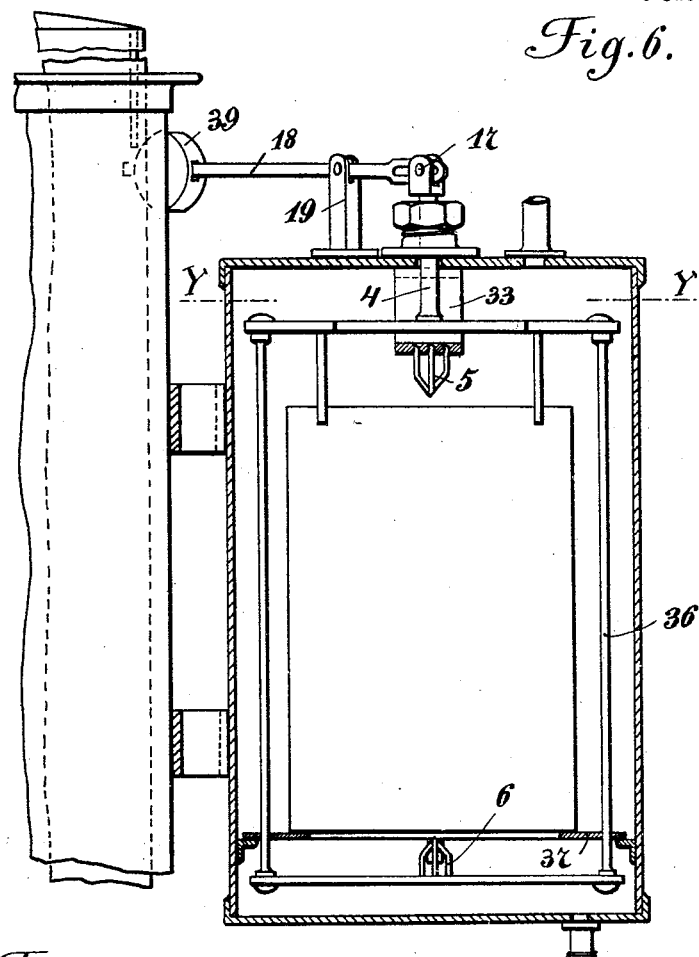
Figure 6A:
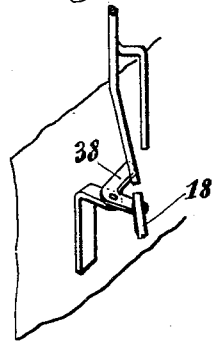

Figure 1 is a front elevation of one form of embodying the present invention, showing the left-hand water or liquid holder in partial section. Fig. 2 is a side elevation with the water-holder in partial section. Fig. 3 is a part plan with the cover of the liquid-holder partly broken away. Fig. 4 is a vertical section through a modified form of gas-generator; Fig. 5, a part-sectional plan of the same on the line X X of Fig. 4; Fig. 6, a further modification of the generator; Fig. 6ª, a detail, and Fig. 7 a sectional plan of the same on line Y Y of Fig. 6.

Referring first to Figs. 1 to 3, the generator 1 is of the construction described in the patent above referred to—*i. e.*, the case containing the gas-producing agent is placed in the same through the bottom cover and supported above a punch fixed in the cover by means of a spring, the upper punch being attached inside the generator to the end of the spindle 4, which also carries a plate. The latter, as is known, depresses the case onto the lower stationary punch as soon as the top movable punch has penetrated far enough into the top of the case. Within an outer holder 2 the liquid-containing reservoir 43 is mounted on pivots 46 and may be overturned, so as to deposit its contents into the outer holder 2. The liquid-holder 43 when filled with water or other liquid has a tendency to turn on its pivots 46 and throw the contents into the outer receptacle or holder 2, owing to the action of its weight 42; but it is prevented from so doing by means of the trip-lever 44, pivotally mounted at 45 to the gasometer-tank or to the stationary outer holder 2. When the bell descends, a nose 41 on the same depresses the trip-lever 45, throwing it from under the catch of the movable liquid-holder and allowing the weight of the same to act to turn the said holder on its pivots and upset the contents into the outer holder 2, as will be readily understood on reference to the drawings. The liquid passes down the siphon-pipe 3 into the generator-chamber 1, where it floods the case containing the gas-producing agent. At the same time, however, another finger 23 on the gasometer-bell acts on the top of a substantially vertically-guided rod 20, hinged at 33 to the free end of a lever 18, having its opposite end pivotally connected at 18' to one of the standards 18'', on which the holder 2 is supported, above the generator 1 or at any other suitable stationary point. This lever 18 is connected by a pin-and-slot connection to the top of the lever or spindle 4, as inidcated at 4', and the said lever or spindle 4 carries the movable punch, as previously described. As the bell descends it depresses the lever 18 and punctures the case containing the gas-producing agent, as particularly described with reference to the patent mentioned previously. It is of course immaterial whether the water or other liquid is overturned at the moment of puncturing or a moment before or after the puncture has been effected. As soon as the puncture has been effected and the liquid admitted to the generator the production of gas commences and the gas passes along the pipe 28 to a depurator 29, which may be, if desired, such as is embodied in an application for United States Letters Patent filed by me on the 17th day of December, 1900, and bearing Serial No. 40,127, and thence along pipe 30 to the gasometer, which immediately commences to rise, releasing the lever 18, which is returned to its normal position by means of the spring 21. The liquid passes through the punctures to the gas-producing agent within the punctured case and gas is produced.

In practice I have found it advantageous to so adjust the mechanism that the puncturing-points will be permitted to enter the carbid-case far enough to form a hole or opening as large as the full size of the puncturing-points and after that has been accomplished to then release the water-reservoir. By this adjustment the bell of the gasometer is allowed to fall until the full-sized openings are made.

As stated in the introduction to the present specification, the punches hitherto employed in connection with this apparatus have been solid, and consequently the liquid could not gain access to the gas-producing agent until the said punches had been withdrawn. Since the bell of the gasometer must rise, in the present case before the punches are withdrawn and in order to enable the bell to rise gas must be produced, it is necessary to employ a form of punch which will admit the liquid and allow the gas produced to escape from the sealed and punctured case before the punches have been withdrawn. This is effected by the hollow punch illustrated in Figs. 4 and 5. This punch 5 may be made of any suitable material and is hollow, so that as soon as the case 8 has been punctured the gas production may begin before the punch has been withdrawn from the orifice produced. The punch may be produced from a solid piece of metal provided with channels down the side surfaces or down the center; but I have found it advantageous to make the same of steel wire in the form of a cage, as illustrated, and having the point hardened and sharpened.

In the case of apparatuses requiring large quantities of the gas-producing agent to be developed at one and the same time it will be necessary to somewhat modify the case-puncturing mechanism of the patent above referred to, because the lower spring will not serve well to raise a very heavy case, soon getting out of order. In order to meet this requirement the device shown in Figs. 4 to 7 has been provided. In this case the case 8, carrying the gas-producing agent, is supported on two or more bows 40, mounted rigidly on the cover 12. The cover is hinged to the bottom of the generator at 11 and retained tightly closed by means of the bow 13, screw-spindle 15, and retaining-hook 14, as well known in connection with gas-tight closures. The spindle 4 extends through the stuffing-box 16 in the top plate of the generator and is pivoted at 17 to the actuating-lever 18, fulcrumed on the standard 19, as illustrated. In this case the spindle 4 does not carry the movable punch at the top, as hitherto, but is provided with a bow or cage 7, having guides 7' to retain the case 8 and being provided at the lower end with a hinged strap or bar 9, hinged to one side of the same at 10 and capable of being hung into the opposite side in any well-known manner. This bar 9 carries the movable punch 6, which is also hollow, while the top stationary punch 5 is mounted on the bridge 33, fixed to the inside of the top plate of the generator and deep enough to allow the spindle 4, with the cage 7, sufficient play to raise the case 8 up to the said punch 5 and force it over the same. This device operates in the following manner: When the bell depresses the rod 20, the lever 18 is also depressed and raises the spindle 4, with the cage 7. This causes the lower punch 6 to perforate the bottom of the case 8, and on continuing to rise the plate 9 lifts the case 8, with the cage 7, and forcing it up pushes it over the upper stationary punch 5, so that both ends of the case will be punctured. As the gas is produced and the bell gradually rises the punches will be gradually withdrawn by the action of the spring 21. The lower bar 9 is advantageously provided with a dip, as at 9', to prevent the bar from closing against the bottom of the case, and thus obstructing the puncture.

Figure 7:
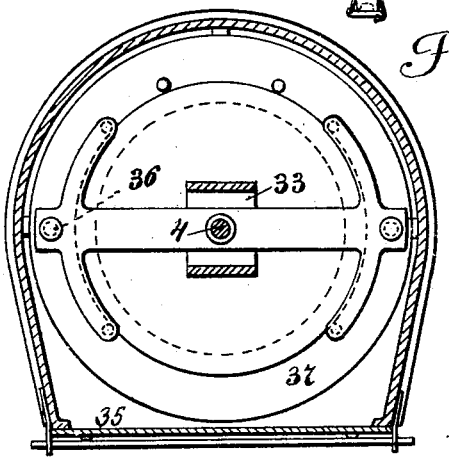

In the modification shown at Figs. 6 and 7 the door of the generator is arranged at the side, as at 35, and the case is inserted through the same and placed on a stationary plate 37 above the lower punch 6, which is supported at the bottom of the cage 36, carried by the spindle 4. The construction is otherwise similar to that described with reference to Figs. 4 and 5. If very large cases of the gas-producing agent are employed, it may be necessary to provide a counterpoise for the same, as indicated at 39, so that the generator-bell will be relieved of the work of raising the whole weight of the case against the upper punch. In order to prevent the weight 39 from forcing the lower punch into the case, the said weight may be held by a catch 38, Fig. 6ª, which may be released by the finger of the bell when the same falls to produce the puncture.

In the present specification two generators are illustrated, which are alternately set in action. The means for alternately operating the generators consist of the switch 24, pivotally mounted at 26 on a standard 27 and provided with counterpoise 25. As the bell descends the finger 23 will be guided along the side of the switch 24 and will depress the left-hand rod 20 in Fig. 1. This downward movement of the finger throws the switch over on its pivot, so that it will lie in the opposite position to that in Fig. 1. As the bell rises after the generator has been set in action the finger will not throw the switch-tongue back, but will just lift it and pass up underneath it, so that when the bell again descends the switch will be lying in the opposite position to that of Fig. 1 and will turn the bell to the right of that figure, thus operating the right-hand generator at the next descent.

I claim as my invention—

1. The combination with a generating-chamber, of a bow or cage; a case within said bow or cage containing the gas-producing agent; means operable externally of the chamber to raise the cage within the said chamber; and punching mechanism within the chamber to punch both ends of the case when the said cage is raised.

2. In a gas-generator, the combination of a gas-holder having a movable part controlled by the gas volume; a generator-chamber connected therewith; a case containing a gas-producing agent located within the generator; a housing containing a movable liquid-containing receptacle mounted therein and connected with said chamber; punches, having top and sides of cage-like construction, adapted to perforate the case and partly enter the same; a pivotal shaft for operating the punches; and means controlled by the movable part of the gas-holder for operating the shaft, capsizing the receptacle and retaining the punches in their perforations and for permitting their withdrawal therefrom upon the increase of volume of gas within the gasometer.

3. In a gas-generator, the combination of a gas-holder having a movable part controlled by the gas volume; a hermetically-sealed generator-chamber connected therewith; a hermetically-sealed case containing a gas-producing agent located within the generator; a housing containing a movable liquid-containing receptacle mounted therein and connected with said chamber; punches, having top and sides of cage-like construction, adapted to perforate the case and partly enter the same, and permitting the escape of gas and entrance of water while still remaining within the case; a pivotal shaft for operating the punches; and means controlled by the movable part of the gas-holder for operating the shaft, capsizing the receptacle and retaining the punches in their perforations and for permitting their withdrawal therefrom upon the formation of gas.

4. The combination with a generator-chamber, of a case containing a gas-producing agent, and punches having top and sides of cage-like construction adapted to perforate the case and partly enter the same.

5. In a gas-generator, the combination of a gasometer and bell; a gas-generating chamber and case therein containing the gas-producing agent; punching mechanism and means for operating the same by the bell; and a switch having a movable tongue to turn the bell as it falls and shift the position of the same substantially as described.

6. In a gas-generator, the combination of a gasometer having a bell capable of being oscillated and also movable by the gas volume; a generator-chamber connected therewith; separated gas-producing agents; a switch having a movable tongue effective upon the bell at its successive falls to oscillate the same; and means operable by the falling of said bell and effective to bring the gas-producing agents in contact within said chamber.

7. In a gas-generator, the combination of a gasometer having a bell movable by the gas volume; a generator-chamber connected therewith; separated gas-producing agents;

a switch having a movable tongue effective upon the bell as it falls to shift the position of the same, and shiftable by said bell on the same fall, into a position to again shift said bell upon its next fall; and means operable by the falling of said bell and effective to bring the gas-producing agents in contact within said chamber.

8. In a gas-generator, the combination of a gasometer having a bell capable of being oscillated, and a switch having a movable tongue effective upon the bell at its successive falls to oscillate the same.

9. In an acetylene-gas generator, the combination with the bell of a gasometer, of a closed receptacle in communication therewith; a case containing carbid located in the receptacle; a pivoted water-tank in communication with the receptacle; a shaft projecting into the receptacle and carrying a sliding cage provided with a hollow punch for perforating the lower part of the case and adapted to raise the case against a hollow punch; and means controlled by the gasometer for capsizing the tank and actuating the shaft.

10. In an acetylene-gas generator, the combination with the movable part of a gas-holder, of a closed receptacle in communication therewith; a case containing carbid located in the receptacle; a pivoted water-tank in communication with the receptacle; a shaft projecting into the receptacle; a sliding cage carried thereby and provided with a hollow punch for puncturing the lower part of the case for the admission of water and adapted to raise the case against a hollow punch for puncturing the top of the case for the exit of gas; and means controlled by the movable part of the gas-holder for capsizing the tank and raising the cage.

11. A valveless gas-generator comprising a gas-holder having a movable part actuated by the gas volume; a generator-chamber connected therewith; a charger containing the gas-producing agent; a charger containing a liquid; and means operable by said movable part upon its motion caused by reduced gas volume effective upon the chargers to bring the gas-producing agent and liquid into contact within said chamber.

12. A valveless gas-generator comprising a gas-holder having a movable part actuated by the gas volume; a generator-chamber connected therewith; a gas-producing agent; a liquid; and means operable by said movable part upon its motion caused by reduced gas volume effective to bring the gas-producing agent and liquid into contact within said chamber.

13. A valveless gas-generator comprising a gas-holder; a movable part; a generator-chamber connected therewith; a series of chargers containing a gas-producing agent; a series of chargers containing a liquid; and means operable by said movable part upon its motion caused by reduced gas volume effective to bring a charge from each series into contact within said chamber.

14. In a valveless gas-generator, the combination with a series of chargers containing a gas-producing agent; a series of chargers containing an element coöperative with said gas-producing agent; and means operable by the reduction of gas volume effective to bring a charge from each of said series into contact.

15. In a gas-generator, the combination of a gas-holder having a part capable of rising and falling upon the change in volume of the gas therein; generator-chambers adjacent thereto; means connected with the movable part for actuating the generators; means for oscillating the movable part to bring the actuating means into operative position upon the fall thereof, said oscillating means being itself movable by said movable part upon the same fall into a position to again oscillate the movable part upon its next fall.

16. In a gas-generator, the combination of a gasometer having a bell; a switch having a movable tongue effective upon the bell as it falls to oscillate the bell and shiftable by said bell on the same fall into a position to oscillate the bell upon its next fall into the position it occupied at the inauguration of its first fall.

In witness whereof I have hereunto set my hand in presence of two witnesses.

GEORGE GREGORY SMITH.

Witnesses:
SPIRITO ZEMARTZ,
EUGENIE CECCHINI.